(12) United States Patent
Lim et al.

(10) Patent No.: US 9,541,714 B2
(45) Date of Patent: Jan. 10, 2017

(54) BIDIRECTIONAL OPTICAL TRANSCEIVER MODULE AND METHOD OF ALIGNING THE SAME

(71) Applicant: Electronics and Telecommunications Research Institute, Daejeon-si (KR)

(72) Inventors: Kwon Seob Lim, Gwangju-si (KR); Hyun Seo Kang, Gwangju-si (KR); Keo Sik Kim, Gwangju-si (KR); Young Sun Kim, Gwangju-si (KR); Jae Hoon Kim, Jeonju-si (KR); Hyoung Jun Park, Gwangju-si (KR); Eun Kyoung Jeon, Gwangju-si (KR); Young Soon Heo, Gwangju-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 27 days.

(21) Appl. No.: 14/743,469

(22) Filed: Jun. 18, 2015

(65) Prior Publication Data

US 2015/0372759 A1    Dec. 24, 2015

(30) Foreign Application Priority Data

Jun. 18, 2014 (KR) .................. 10-2014-0074557

(51) Int. Cl.
*H04B 10/00* (2013.01)
*G02B 6/42* (2006.01)
(Continued)

(52) U.S. Cl.
CPC ............... *G02B 6/42* (2013.01); *G02B 6/4201* (2013.01); *G02B 6/4246* (2013.01);
(Continued)

(58) Field of Classification Search
CPC .......... H04B 10/40; H04B 10/43; H04J 14/02; H04J 14/0216; G02B 6/4201–6/4277
(Continued)

(56) References Cited

U.S. PATENT DOCUMENTS

| 5,485,538 A * | 1/1996 | Bowen ................. G02B 6/4246 356/141.1 |
| 7,093,988 B2 * | 8/2006 | Tsumori ............... G02B 6/4201 385/92 |

(Continued)

FOREIGN PATENT DOCUMENTS

| KR | 10-2011-0112770 A | 10/2011 |
| WO | WO-2007/114053 A1 | 10/2007 |
| WO | WO 2007114053 A1 * | 10/2007 ........... G02B 6/4246 |

*Primary Examiner* — Li Liu
(74) *Attorney, Agent, or Firm* — Rabin & Berdo, P.C.

(57) ABSTRACT

Disclosed are a bidirectional optical transceiver module and a method of aligning the same. The bidirectional optical transceiver module includes: a package having on one side a cavity; a platform mounted on the package; a transmitter which generates output light; a holder which includes the horizontal portion having the through-hole and disposed on the package to cover the cavity, and the vertical portion which has the inclined surface on one side and the connection hole connected to the through-hole; a receiver which generates an electric signal that corresponds to input light incident into the cavity; and a WDM filter that delivers the output light and the input light.

16 Claims, 16 Drawing Sheets

(51) Int. Cl.
  *H04J 14/02*    (2006.01)
  *H04B 10/40*    (2013.01)
(52) U.S. Cl.
  CPC ......... *G02B 6/4257* (2013.01); *G02B 6/4263* (2013.01); *G02B 6/4277* (2013.01); *H04B 10/40* (2013.01); *H04J 14/02* (2013.01); *Y10T 29/49771* (2015.01)
(58) Field of Classification Search
  USPC ............ 398/79, 82–88, 135–139; 385/14–93
  See application file for complete search history.

(56) References Cited

U.S. PATENT DOCUMENTS

| | | | | |
|---|---|---|---|---|
| 7,290,942 B2* | 11/2007 | Kuhara | ............... | G02B 6/4206 385/53 |
| 7,917,036 B2 | 3/2011 | Ori et al. | | |
| 8,005,367 B2* | 8/2011 | Nakanishi | ............. | G02B 6/4246 398/138 |
| 8,121,484 B2* | 2/2012 | Kihara | ............... | H01S 5/02212 398/135 |
| 8,235,605 B2* | 8/2012 | Kim | ..................... | G02B 6/4246 359/629 |
| 8,265,486 B2* | 9/2012 | Lim | ..................... | G02B 6/4246 385/89 |
| 8,277,132 B2* | 10/2012 | Lee | ..................... | G02B 6/4246 385/88 |
| 8,503,884 B2* | 8/2013 | Lee | ....................... | H04B 10/40 385/14 |
| 8,992,100 B2* | 3/2015 | Lim | ..................... | G02B 6/4201 385/88 |
| 9,372,315 B2* | 6/2016 | Miao | ..................... | H04B 10/40 |
| 2004/0071413 A1* | 4/2004 | Tsumori | ............... | G02B 6/4201 385/93 |
| 2004/0146304 A1* | 7/2004 | Kuhara | ................ | G02B 6/4206 398/138 |
| 2005/0036730 A1* | 2/2005 | Shyu | ..................... | G02B 6/4215 385/14 |
| 2006/0013541 A1* | 1/2006 | Plickert | ................ | G02B 6/4246 385/89 |
| 2006/0269197 A1* | 11/2006 | Uno | ..................... | G02B 6/4246 385/93 |
| 2007/0237465 A1* | 10/2007 | Okada | .................. | G02B 6/4246 385/92 |
| 2009/0129783 A1 | 5/2009 | Ori et al. | | |
| 2009/0202244 A1* | 8/2009 | Jin | ....................... | G02B 6/4201 398/67 |
| 2009/0269067 A1* | 10/2009 | Kihara | ................ | H01S 5/02212 398/79 |
| 2009/0279894 A1* | 11/2009 | Pan | ...................... | G02B 6/4246 398/79 |
| 2010/0226655 A1* | 9/2010 | Kim | ..................... | G02B 6/4246 398/139 |
| 2011/0044696 A1* | 2/2011 | Lim | ..................... | G02B 6/4246 398/139 |
| 2013/0034357 A1* | 2/2013 | Lim | ..................... | G02B 6/4201 398/79 |
| 2016/0004019 A1* | 1/2016 | Joerg-Reinhardt | .. | G02B 6/4246 385/33 |

* cited by examiner

BIDIRECTIONAL OPTICAL TRANSCEIVER MODULE AND METHOD OF ALIGNING THE SAME

CROSS-REFERENCE TO RELATED APPLICATION(S)

This application claims priority from Korean Patent Application No. 10-2014-0074557 filed on Jun. 18, 2014, in the Korean Intellectual Property Office, the entire disclosure of which is incorporated herein by reference for all purposes.

BACKGROUND

1. Field

The following description generally relates to a bidirectional optical transceiver module and a method of aligning the same, and more particularly to a bidirectional optical transceiver module and a method of aligning the same, in which optical transmission and reception may be performed at the same time by using one optical fiber and one package.

2. Description of the Related Art

In a general bidirectional optical transceiver module, a TO-CAN based optical transmitter and receiver are aligned in a metal housing and fixed by laser welding, in which bidirectional optical-coupling of the optical transmitter and the optical receiver is performed by reflection or transmission using an optical filter mounted in the housing. In an active optical alignment method of laser-welding two TO-CAN packages, optical alignment may be facilitated, but costs increase as many components are needed, including two TO-CAN packages and a metal housing, and mass productivity is decreased as more processes are required. While a bidirectional optical transceiver module disclosed in U.S. Patent Publication Nos. 2009/0269067, 2009/0129783, and 2006/0269197 may enable bidirectional optical transmission and reception using one TO-CAN, there is a problem in that since a transmitter and a receiver are mounted in the same space of a single TO-CAN, optical and electrical crosstalk may occur.

Further, U.S. Pat. No. 7,093,988 suggests a method of isolating a receiver by separately providing a cap having an inclined surface at an angle of 45 degrees to reduce optical and electrical crosstalk. However, the method also has problems in that: another cap provided in addition to an existing cap increases production and processing costs; a hole is required to be formed on a part of the 45-degree inclined surface for optical coupling to a light receiving element of a receiver; and the diameter size of the hole may not be reduced due to the structure, such that optical and electrical crosstalk may not be reduced sufficiently.

Moreover, in the general method, the length of a bonding wire and a lead wire is increased, thereby making high-speed signal transmission difficult.

In addition, in the case where an isolator is required to be mounted in a transmitter, if the isolator is interposed between a light source and an optical filter, the distance between the light source and the filter gets larger. In this case, the thickness of a package is increased since the distance between a light receiving source of a receiver and the filter gets larger, and optical coupling efficiency is degraded.

SUMMARY

In order to solve the above problems of the general method, a bidirectional optical transceiver module and a method of aligning the same are provided, in which by using one optical fiber and one package, optical and electrical crosstalk may be minimized while maximizing optical coupling efficiency.

In one general aspect, there is provided a bidirectional optical transceiver module, including: a package which has on one side a cavity that is inwardly recessed and through which a plurality of lead wires pass; a platform which is mounted on the package; a transmitter, such as a laser-diode (LD) and/or a monitoring photo-detector (mPD), which is mounted on one side of the platform and generates output light according to an electric signal transmitted through at least one of the plurality of lead wires; a holder which includes the horizontal portion having the through-hole and disposed on the package to cover the cavity, and the vertical portion which has the inclined surface on one side and the connection hole connected to the through-hole, and which protrudes on the top of the horizontal portion; a receiver, such as a photo-detector (PD), a trans-impedance amplifier (TIA) and/or a capacitor, which is mounted in the cavity, generates an electric signal that corresponds to input light that passes through the through-hole and the connection hole to be incident into the cavity, and outputs the generated electric signal through at least one of the plurality of lead wires; and a wavelength division multiplexing (WDM) filter that is disposed on the inclined surface of the vertical portion to deliver the output light toward an optical fiber and to deliver the input light toward the connection hole and the through-hole.

In another general aspect, there is provided a method of aligning a bidirectional optical transceiver module, the method is performed by the bidirectional optical transceiver module comprising: a package having on one side a cavity that is inwardly recessed and on the other side a platform mounting groove, in which a receiver mounting groove is formed on the bottom surface of the cavity, and a plurality of lead wires pass through the package; a platform mounted on the package and having an alignment mark to align a transmitter; the transmitter mounted on one side of the platform and configured to generate output light according to an electric signal transmitted through at least one of the plurality of lead wires; a holder which includes the horizontal portion having the through-hole and disposed on the package to cover the cavity, and the vertical portion which has the inclined surface on one side and the connection hole connected to the through-hole, and which protrudes on the top of the horizontal portion; a receiver which is mounted in the cavity, generates an electric signal that corresponds to input light that passes through the through-hole and the connection hole to be incident into the cavity, and outputs the generated electric signal through at least one of the plurality of lead wires; and a WDM filter disposed on the inclined surface of the vertical portion and configured to deliver the output light toward the optical fiber and deliver the input light toward the connection hole and the through-hole, in which the method including: mounting the receiver in the receiver mounting groove of the package; mounting the transmitter in the platform according to the alignment mark formed on the platform; mounting the platform in the platform mounting groove of the package; and fixing the WDM filter by aligning the holder using a monitor of an optical microscope that is positioned on the same line as an optical axis of the receiver so as to overlap active areas of the transmitter and the receiver.

Figure 1:
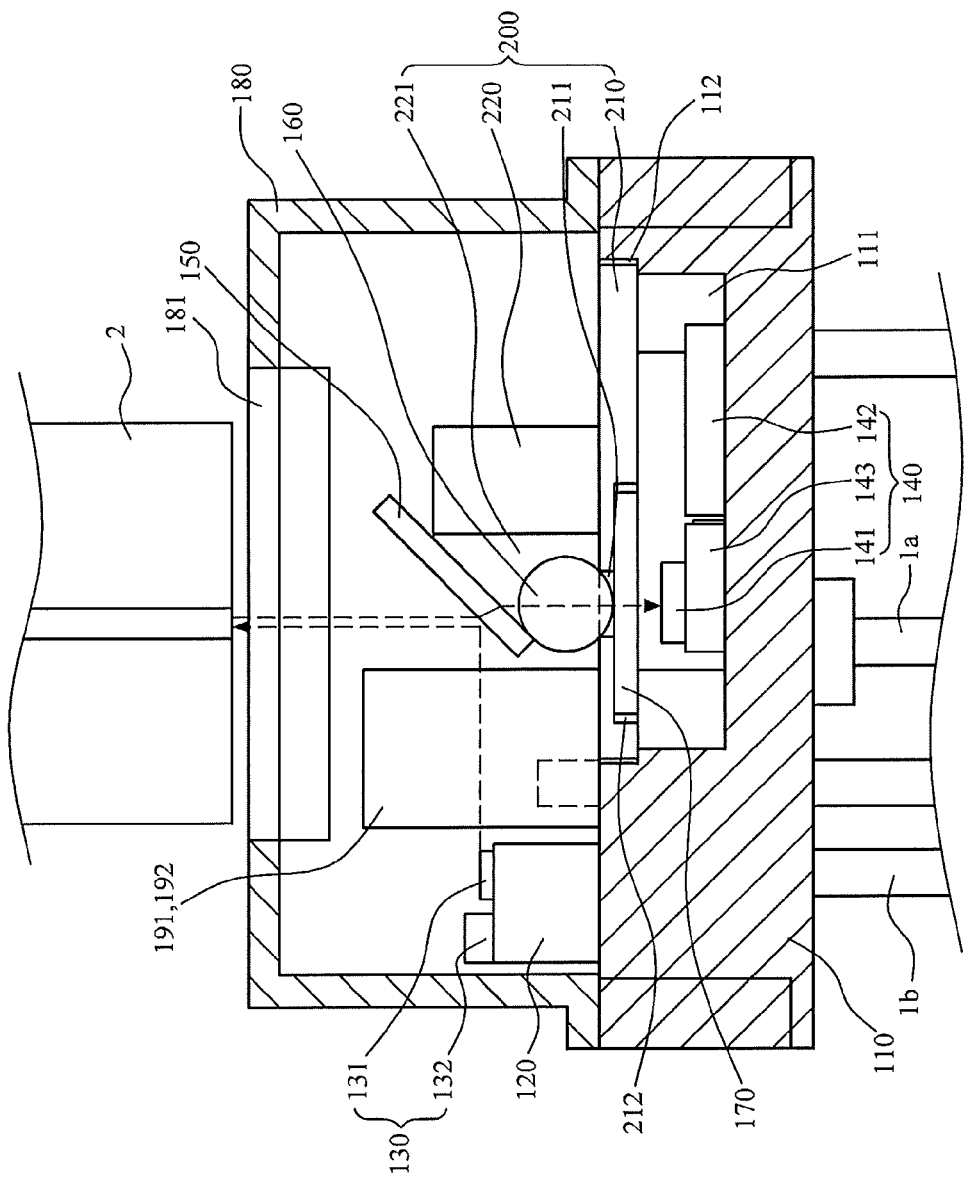
FIG. 1 is a cross-sectional view explaining the structure of a bidirectional optical transceiver module according to an exemplary embodiment.
Figure 2:
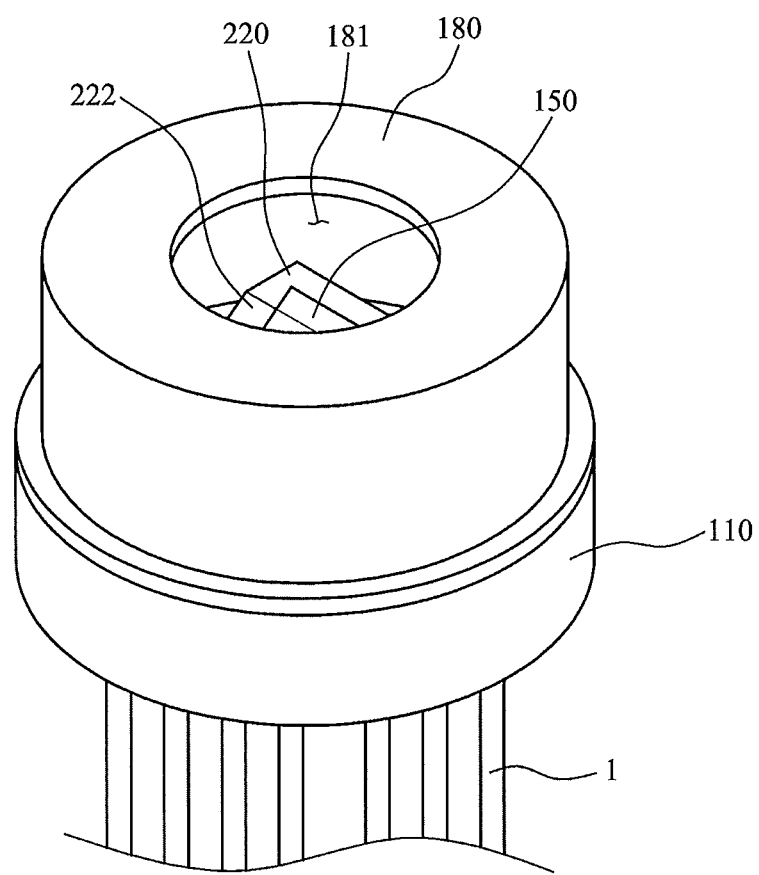
FIG. 2 is a perspective view explaining the structure of a bidirectional optical transceiver module according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the bidirectional optical transceiver module will be described in detail with reference to the accompanying drawings. The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The present disclosure relates to a bidirectional optical transceiver module, in which a transmitter and a receiver are integrated in one package but physically separated to minimize electrical and optical crosstalk and maximize optical coupling efficiency. An embodiment thereof is illustrated in FIGS. 1 to 4.

As illustrated in FIGS. 1 to 4, the bidirectional optical transceiver module includes a package 110, a platform 120, a holder 200, a transmitter 130, a receiver 140, and a WDM filter 150.

A cavity 111 that is inwardly recessed is formed on one side of the package 110, and a plurality of lead lines connected to the transmitter 130 or the receiver 140 that will be described below pass through the cavity 111. The receiver 140 to be described below is mounted in the cavity 111, and the transmitter 130 is mounted on the package 110 at an area where the cavity 111 is not formed. As described above, by forming the cavity 111, the transmitter 130 and the receiver 140 may be mounted in a separate area, thereby reducing optical and electrical crosstalk that may occur during optical transmission and reception.

The platform 120 having a specific height is mounted on the package 110, and the transmitter 130 to be described below is mounted on the top of the platform 120. The platform 120 is mounted on the package 110 at an area where the cavity 111 is not formed. The platform 120 is provided to physically separate the transmitter 130 and the receiver 140.

The transmitter 130 is mounted on the platform 120 and generates output light according to an electric signal transmitted through at least one of the plurality of lead lines 1. The transmitter 130 is mounted on the platform 120 so as to be positioned horizontal to the WDM filter 150; and may include a light source 131 that generates output light in response to the electric signal supplied through the lead lines 1, and a light receiving element 132 for monitoring that is positioned to be adjacent to the light source 131 to monitor output intensity of the light source 131 and output monitoring results through the lead lines 1.

Figure 3:
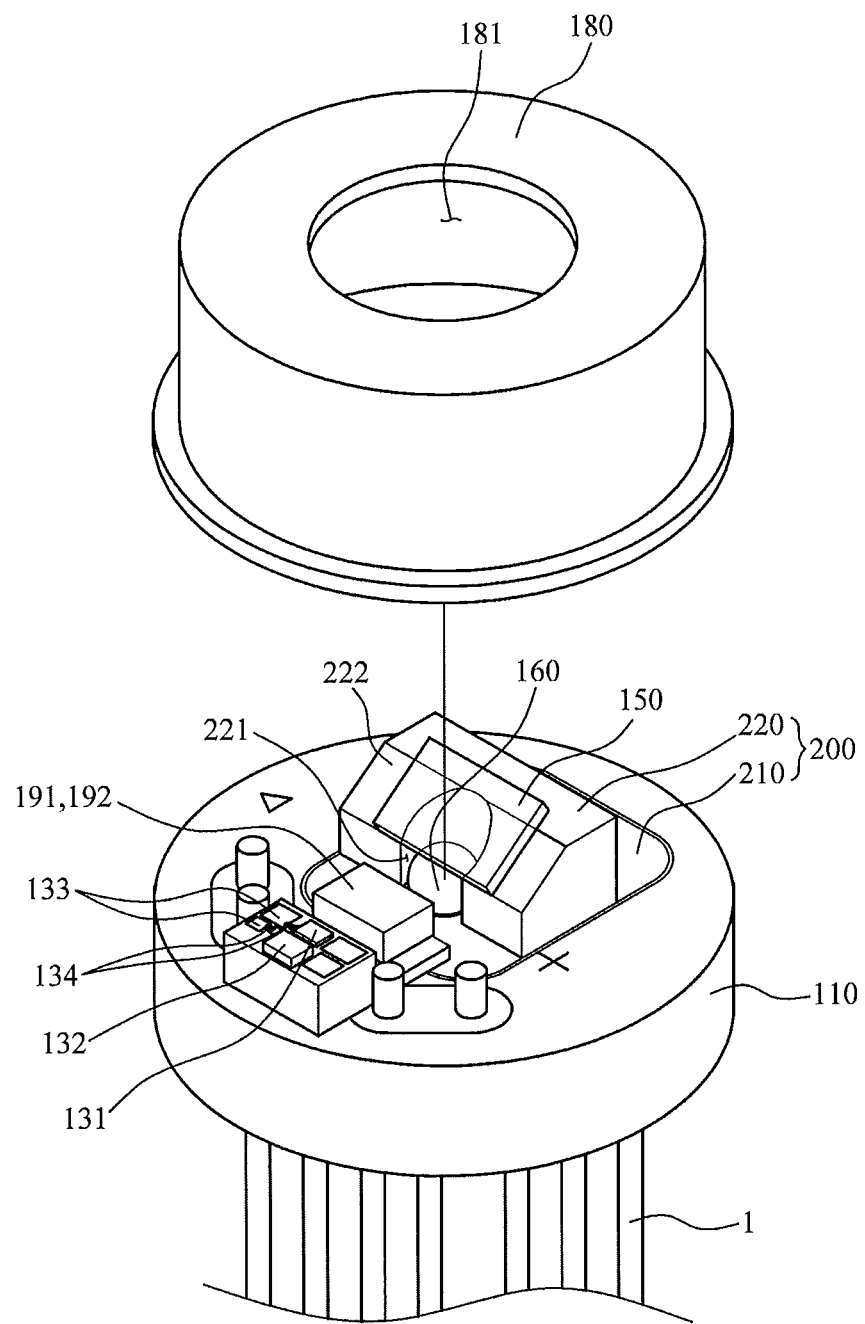
FIG. 3 is a perspective view illustrating the bidirectional optical transceiver module in FIG. 2 from which a cap is removed.

In another example, as illustrated in FIG. 3, a transmission line 133 and a thin-film resistor 134, of which impedance may be controlled, are mounted on the platform 120, so that high-speed signal transmission at 10 G or higher may be allowed by broadband matching using the transmission line 133 and the thin-film resistor 134.

A holder 200 includes a plate-shaped horizontal portion 210, and a vertical portion 220 that is formed on one surface of the horizontal portion 210 at a position vertical to the horizontal portion 210.

First, the horizontal portion 210 is disposed on the package 110 to cover the cavity 111, and includes a through-hole 211 to enable an optical signal to be transmitted to the receiver 140. More specifically, the horizontal portion 210 is mounted on the package 110 to completely cover the cavity 111 of the package 110 so that the transmitter 130 and the receiver 140 may be physically separated to reduce optical and electrical crosstalk. A convex lens 160 which will be described below is mounted on the through-hole 211.

The vertical portion 220 is formed to protrude on the top of the horizontal portion 210 and includes a connection hole 221 that is connected to the through-hole 211, and an inclined surface 222 is formed on one side of the vertical portion 220. The connection hole 221 is formed on the same center line as the through-hole 211, and the convex lens 160 which will be described later is accommodated in the connection hole 221. The inclined surface 222 is formed to be inclined at one side of the vertical portion 220 to face the light source 131 of the transmitter 130, and the Wavelength Division Multiplexing (WDM) filter 150 is mounted on the inclined surface 222. Accordingly, a path of an optical signal output from the light source 131 is changed after passing through the WDM filter 150 mounted on the inclined surface 222, so that the optical signal may be transmitted to an optical fiber 2.

Figure 6:
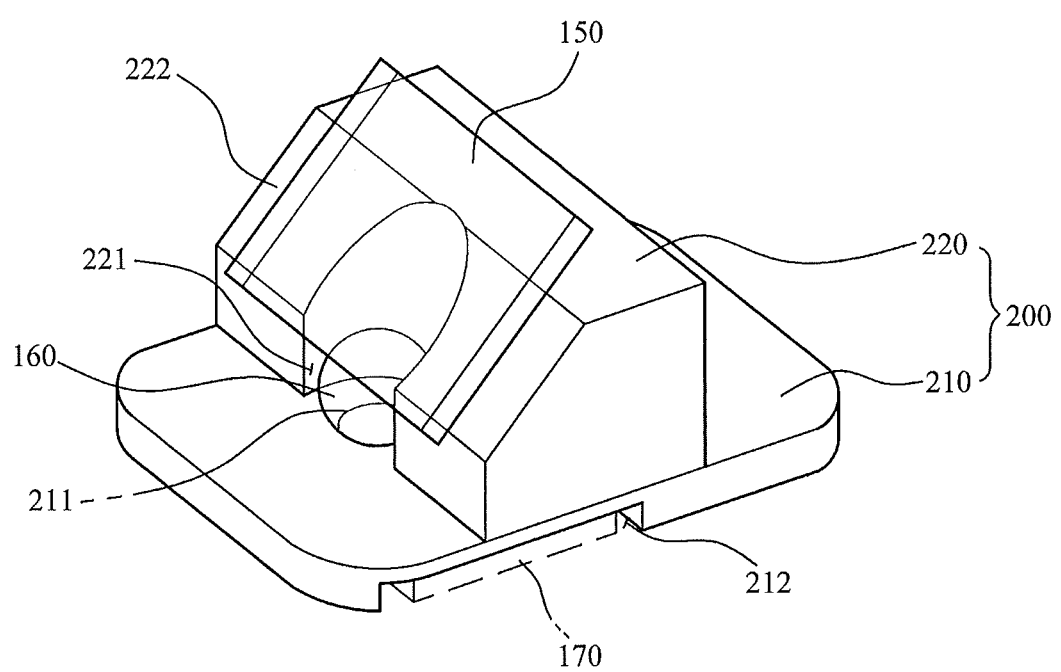
FIG. 6 is a perspective view illustrating a holder in FIG. 3 that is integrally formed.
Figure 7:
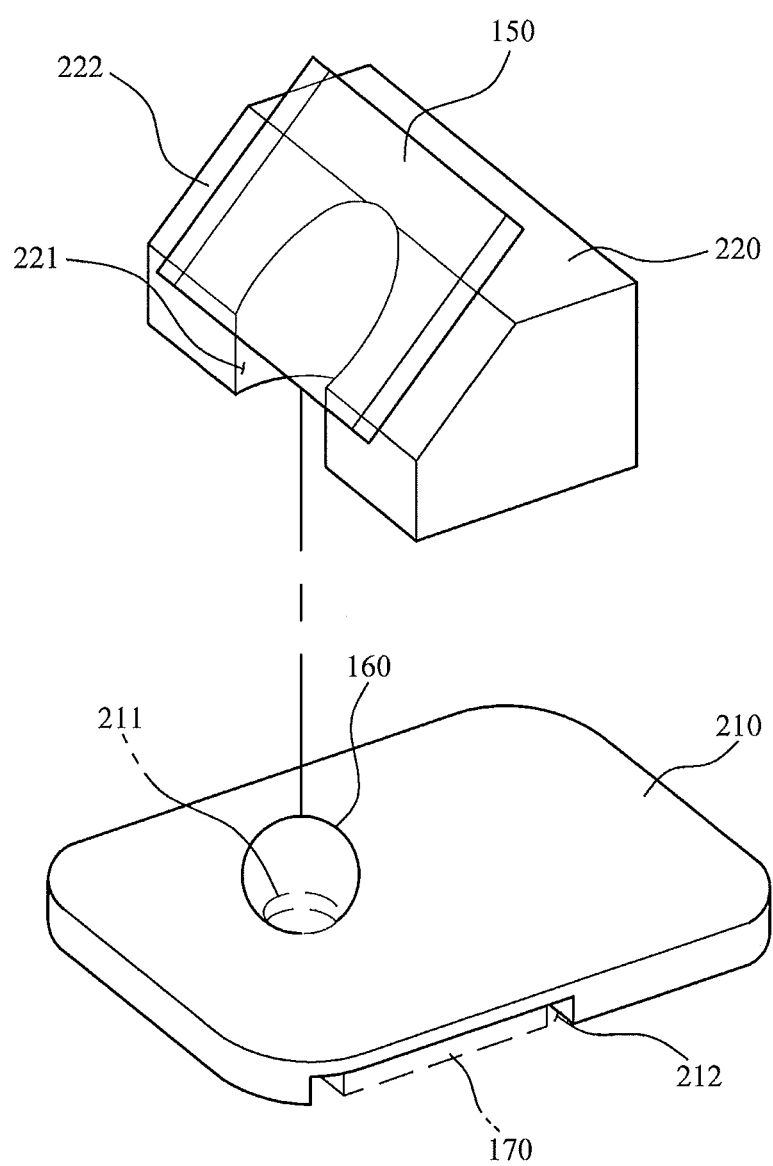
FIG. 7 is a perspective view illustrating a holder in FIG. 3 that is detachable.

FIG. 6 is a perspective view illustrating a holder in FIG. 3 that is integrally formed, and FIG. 7 is a perspective view illustrating a holder in FIG. 3 that is detachable.

As illustrated in FIGS. 6 and 7, the horizontal portion 210 and the vertical portion 220 may be integrally formed so as not to be detached from each other, or may be detachably combined after being manufactured separately. In the latter case where the horizontal portion 210 and the vertical portion 220 are detachably formed, alignment degree of freedom may be provided for alignment of the WDM filter 150.

Figure 8:
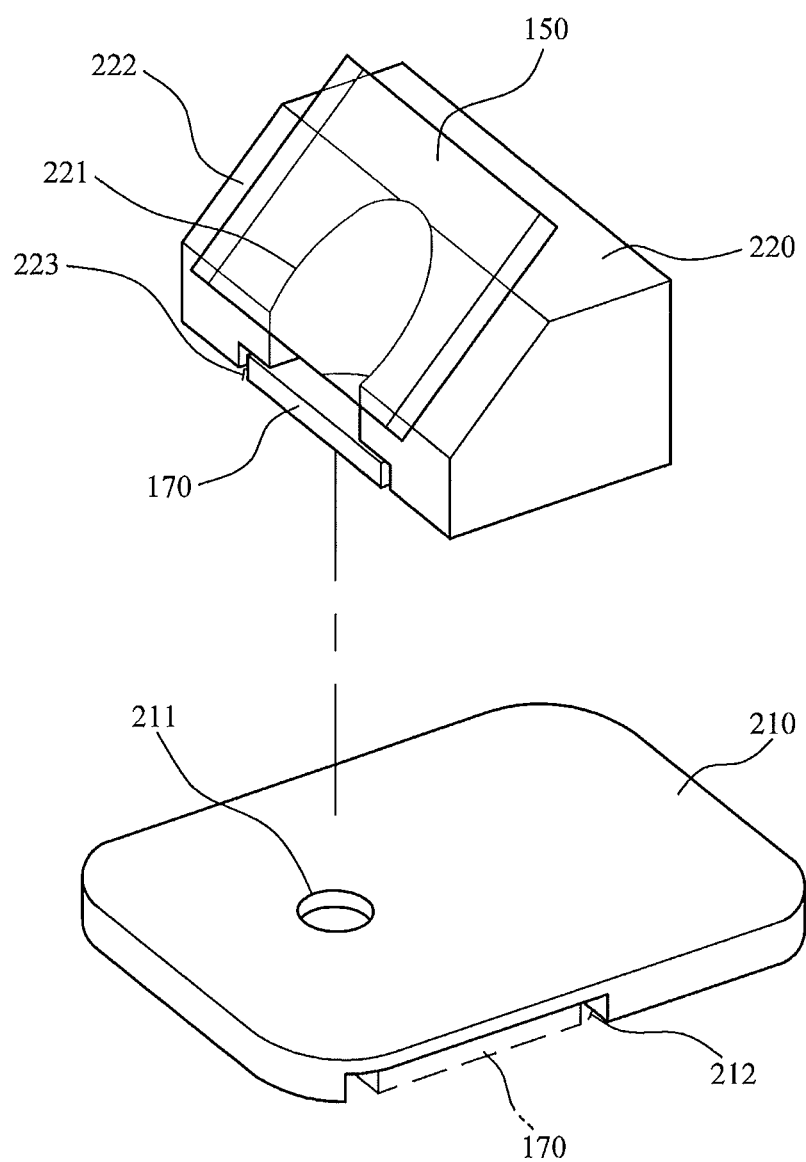
FIG. 8 is a perspective view illustrating a storage groove that is formed in the bottom surface of a vertical portion in FIG. 7.

FIG. 8 is a perspective view illustrating a storage groove that is formed in the bottom surface of a vertical portion in FIG. 7.

In an exemplary embodiment, in the case where the horizontal portion 210 and the vertical portion 220 are detachably formed, a housing groove 223 is inwardly recessed on the bottom surface of the vertical portion 220, and a block filter 170 may be accommodated in the housing groove 223. As described above, in the case where the block filter 170 is accommodated in the housing groove 223, optical alignment of the block filter 170, the through-hole 211, and the convex lens 160 may be performed automatically.

The receiver 140 is mounted in the cavity 111 and generates an electric signal that corresponds to input light that passes through the connection hole 221 and the through-hole 211 to be incident into the cavity 111, and outputs the generated electric signal to at least one of the plurality of the lead wires 1. The receiver 140 may include: a light receiving element 141 which is mounted in the cavity 111 to be positioned at a lower side of the through-hole 211, and generates an electric signal that corresponds to input light that passes through the through-hole 211 to be incident into the cavity 111; and a trans-impedance amplifier (TIA) 142, which is mounted in the cavity 111, amplifies the output of the light receiving element 141, converts a current signal into a voltage signal, and outputs the converted signal through the lead wire 1. In this case, the TIA 142 may include a limiting amplifier if necessary. The receiver 140 may further include, for example, a sub-mount 143 for the light receiving element 141, a capacitor 143 for reducing power supply noise, or the like.

The WDM filter 150 is disposed on the inclined surface 222 of the vertical portion 220, and delivers the output light toward the optical fiber 2 and delivers the input light toward the connection hole 21 and the through-hole 211. The WDM filter 150 may be various optical division means known in the art, such as a beam splitter, as long as the means may divide wavelengths of an optical signal output from the transmitter 130 and an optical signal transmitted to the receiver 140.

For reference, a part 1a of the lead wires 1 is formed in the cavity 111 of the package 110 so as to reduce electrical crosstalk between the transmitter 130 and the receiver 140, and the rest part 1b of the lead wires 1 is formed outside of the cavity 111 of the package 110.

In another example, the through-hole 211 has a diameter that is smaller than the connection hole 221, and the convex lens 160 having a spherical shape is inserted into the connection hole 221 to focus light, in which one side of the convex lens 160 is supported by being inserted into the through-hole 211. Accordingly, the convex lens 160 may be inserted into the connection hole 221, with a bottom portion fixed by being inserted into the through-hole 221.

The convex lens 160 is disposed on the bottom of the WDM filter 150 to reduce a focal length of the light receiving element 141 of the receiver 140, or to more efficiently focus input light. The convex lens 160 may be any other various spherical or aspherical lenses as long as the lens may focus light.

In the present disclosure, the through-hole 211 and the connection hole 221 are provided so that the convex lens 160 used for the receiver 140 to focus light may be easily mounted, and the distance between the WDM filter 150 and the light receiving element 141 may be minimized. Therefore, in the case where an isolator 191 is mounted between the light source 131 and the WDM filter 150, or in the case where the distance between the light source 131 and the WDM filter 150 is large, the distance between the WDM filter 150 and the light receiving element 141 of the receiver 140 gets larger, and thus, the cavity 111 of the package 10 is not required to be formed deeply.

It is generally difficult to manufacture an aspherical lens to have a diameter of 1 mm or less, and the aspherical lens is expensive to manufacture. However, a spherical lens may be easily manufactured to have a diameter of 1 mm or less, and may enable light to be focused twice on the top surface and the bottom surface, thereby reducing a light focusing distance, and a cavity may have a shallower depth, thereby facilitating manufacture and reducing costs.

Figure 4:
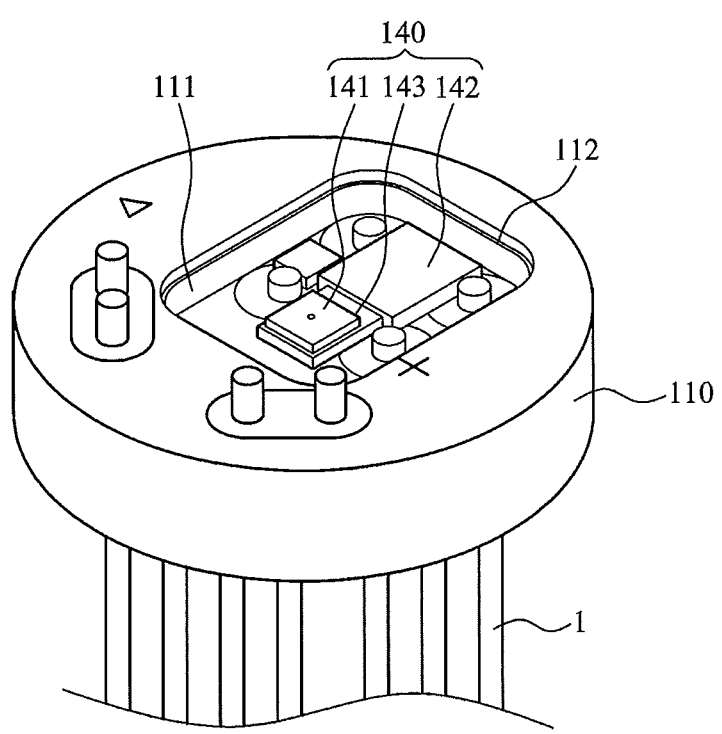
FIG. 4 is a perspective view illustrating the bidirectional optical transceiver module in FIG. 3 from which a holder is removed.
Figure 5:
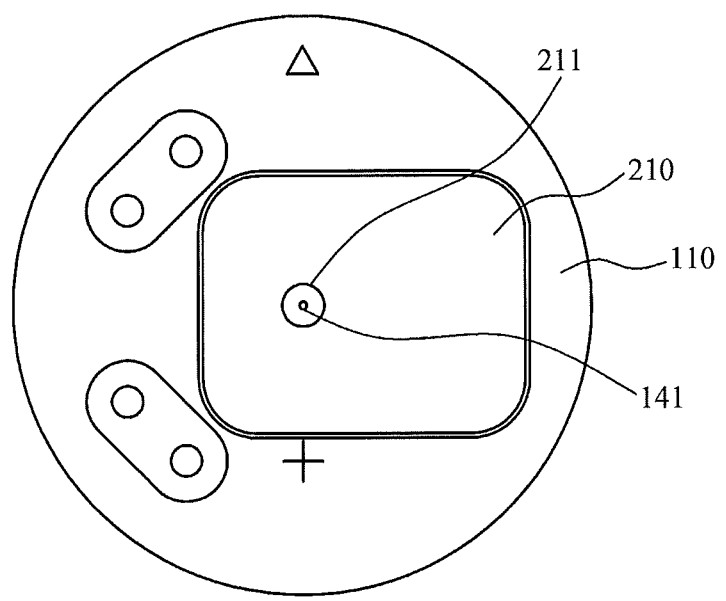
FIG. 5 is a plan view illustrating the bidirectional optical transceiver module in FIG. 4 from which a vertical portion is removed.

FIG. 5 is a plan view illustrating the bidirectional optical transceiver module in FIG. 4 from which a vertical portion is removed. As illustrated in FIG. 5, the light receiving element is formed to be on the same center line as the through-hole 211 and the connection hole 221. Accordingly, by only inserting the convex lens 160 into the through-hole 211, the bottom surface of the convex lens 160 may be fitted into the through-hole 211, thereby enabling automatic optical alignment with the light receiving element 141.

Further, an optical (or electric) signal may pass the light receiving element 141 only through the through-hole 211 and the connection hole 221, such that electrical and optical crosstalk may be minimized. Particularly, electrical crosstalk may be substantially prevented by using a metal material, and a light focusing lens may be further mounted on the top surface or the bottom surface of the horizontal portion 210 to focus an optical signal received by the light receiving element 141. The inclined surface 222 may be formed on one side of the vertical portion 220 so that the WDM filter 150 may be simply mounted on the inclined surface 222.

Figure 15:
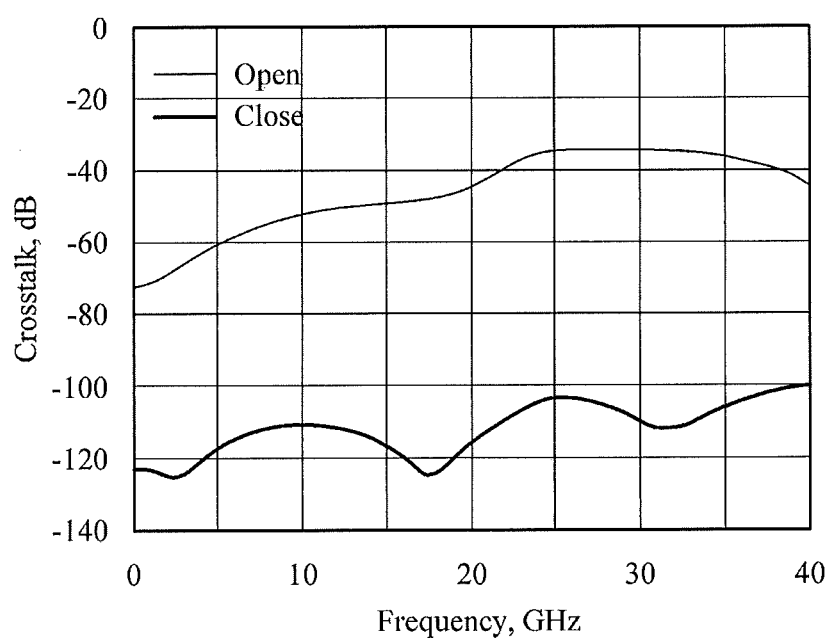
FIG. 15 is a graph illustrating an analysis result of electrical crosstalk between a transmitter and a receiver of the bidirectional optical transceiver according to an exemplary embodiment.
Figure 16:
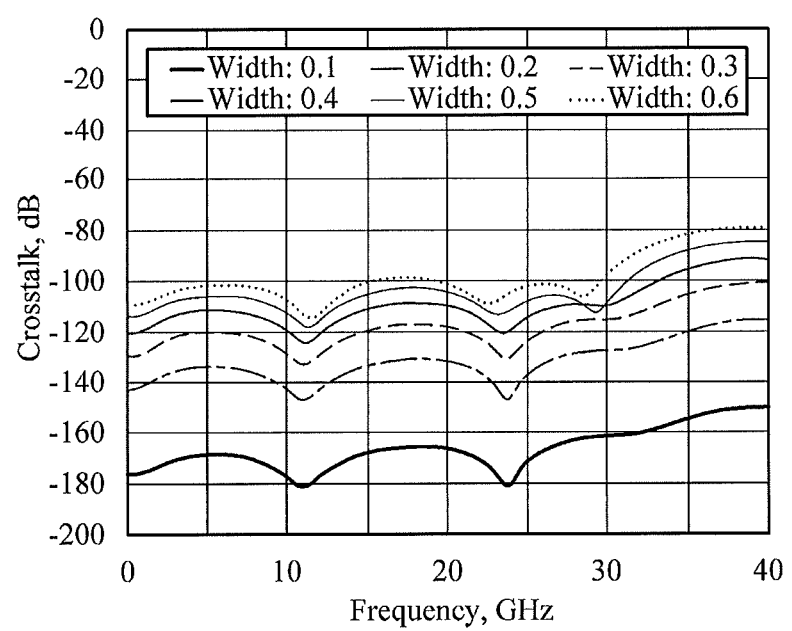
FIG. 16 is a graph illustrating an analysis result of electrical crosstalk depending on the diameter of a through-hole of a holder according to an exemplary embodiment.

FIG. 15 is a graph illustrating an analysis result of electrical crosstalk between a transmitter and a receiver of the bidirectional optical transceiver according to an exemplary embodiment, in which "Open" on the graph refers to the case where the holder 200 is not mounted in the cavity 111, and "Close" refers to the case where the holder 200 is mounted in the cavity 111. As illustrated in FIG. 15, electrical crosstalk, which is one of the biggest problems of a bidirectional optical transceiver module, may be reduced to −100 dB or less in a full band. Further, FIG. 16 is a graph illustrating an analysis result of electrical crosstalk depending on the diameter of a through-hole of a holder according to an exemplary embodiment, in which the smaller the diameter of the through-hole 211 is, the less electric crosstalk occurs, and similarly, optical crosstalk may also be reduced significantly.

Moreover, in the bidirectional optical transceiver according to the present disclosure, the transmitter 130 is mounted by using the platform 120, such that the length of a bonding wire may be minimized, and a thin-film resistor having excellent high frequency characteristics may be used, thereby enabling high-speed signal transmission. In addition, the receiver 140 includes lead wires 1a formed in the cavity 111 of the package 110, such that the length of the lead wire 1a and the length of the boding wire may be minimized, thereby enabling high-speed signal transmission.

In another example, a step-shaped protrusion 112 is formed on an upper side of the cavity 111 by outwardly extending the inner diameter of the cavity 111, and the horizontal portion 210 is mounted on the step-shaped protrusion 112.

As described above, by forming the step-shaped protrusion 112, the horizontal portion 210 may be stably mounted on the package 110, thereby reinforcing coupling between the package 110 and the holder 200, and by fixing the position of the holder 200, optical alignment may be performed easily. Further, in the case where the step-shaped protrusion 112 is formed in plurality to have multiple steps, the horizontal portion 210 may be mounted at a desired height, so that a light focusing distance may be adjusted.

In another example, a block filter 170, through which input light passes after passing through the through-hole 211, is formed on the inner surface of the horizontal portion 210. The block filter 170 is formed to prevent optical crosstalk of the receiver 140. The block filter 170 is formed at a position that may cover the through-hole 211 so that an optical signal may pass through the block filter 170 after passing through the through-hole 211.

In yet another example, a receiving groove 212, in which the block filter 170 is received, is inwardly recessed on the inner surface of the horizontal portion 210. The receiving groove 212 is formed on the bottom surface of the horizontal portion 210, and is formed to be connected to the through-hole 211. Accordingly, as the block filter 170 is received in the receiving groove 212, optical alignment of the block filter 170, the through-hole 211, and the convex lens 160 may be performed automatically.

In yet another example, a cap 180 is formed on the top of the package 110 to cover the platform 120, the transmitter 130, the holder 200, and the WDM filter 150. The cap 180 includes an opening 181 through which an optical signal is input or output. As described above, by separately mounting the cap 180 on the package 110, an upper space of the package 110 and the platform 120 may be covered.

Figure 12:
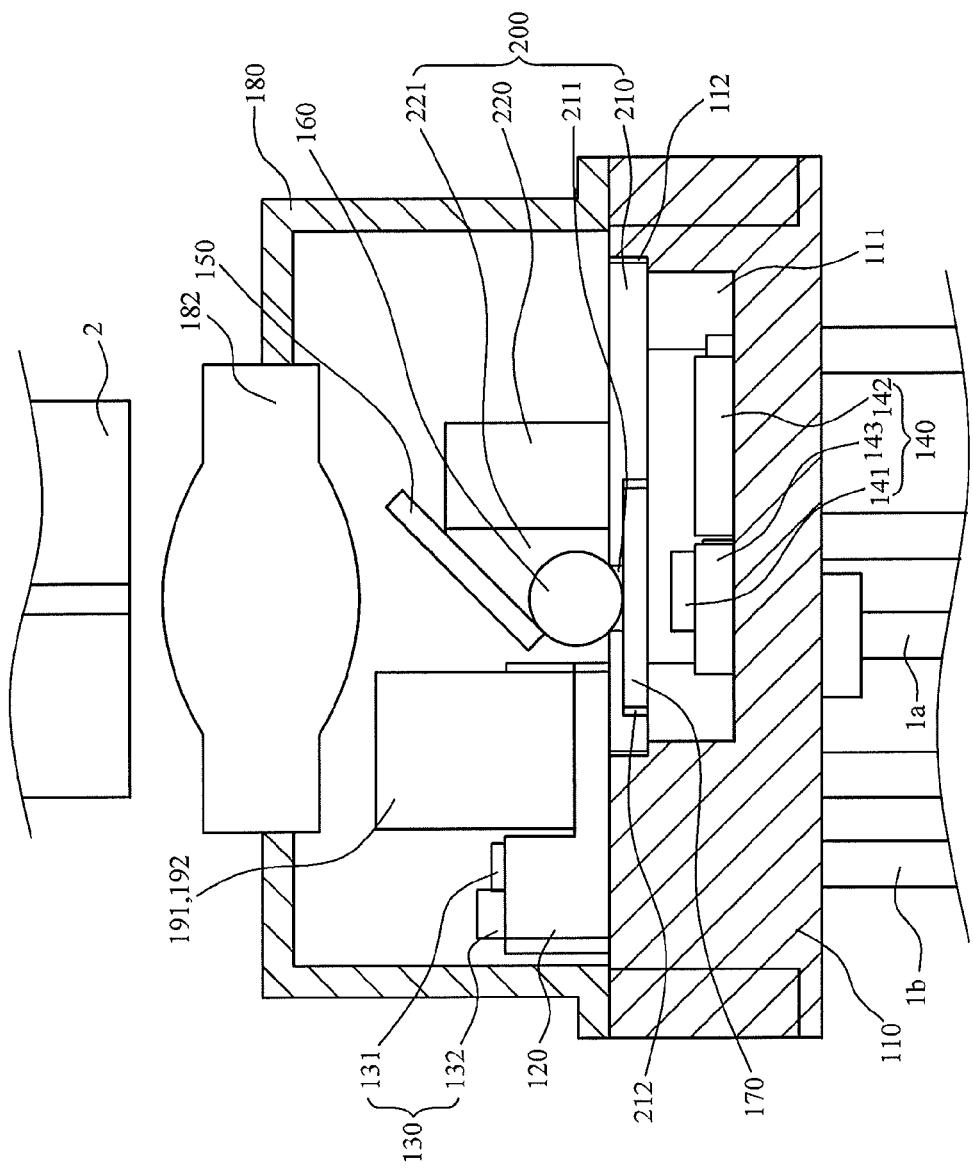
FIG. 12 is a cross-sectional view illustrating a collimating lens mounted on the opening of a cap in FIG. 1.

FIG. 12 is a cross-sectional view illustrating a collimating lens mounted on the opening of a cap in FIG. 1. As illustrated in FIG. 12, a collimating lens 182 may be mounted on the opening 181 of the cap 180.

As described above, by further mounting the collimating lens 182, optical coupling efficiency of the transmitter 130 may be maximized, and a distance between the transmitter 130 and the optical fiber 2 may be minimized, thereby reducing the size of the module. In addition, by controlling a beam size, optical coupling efficiency of the receiver 140 may also be maximized in the same manner as the transmitter 130.

In still another example, an isolator 191 that delivers only the output light toward the WDM filter 150 is disposed between the transmitter 130 and the WDM filter 150. The isolator 191 may be other various known means as long as the isolator may transmit only an optical signal of the light source 131 to the WDM filter 150, and isolates other signals from being delivered to the WDM filter 150 or to the light source 131.

In yet another example, a focusing lens 192 that focuses output light is disposed between the transmitter 130 and the WDM filter 150. The focusing lens 192 is disposed to focus light output from the light source 131. The focusing lens 192 may be disposed not only between the light source 131 of the transmitter 130 and the WDM filter 150, but also between the WDM filter 150 and the optical fiber 2 in some cases. In the case where the isolator 191 is mounted between the light source 131 of the transmitter 130 and the WDM filter 150, the focusing lens 192 and the isolator 191 may be integrally formed, and in the case where the isolator 191 is not mounted, the focusing lens 192 may be formed between the WDM filter 150 and the optical fiber 2.

Figure 9:
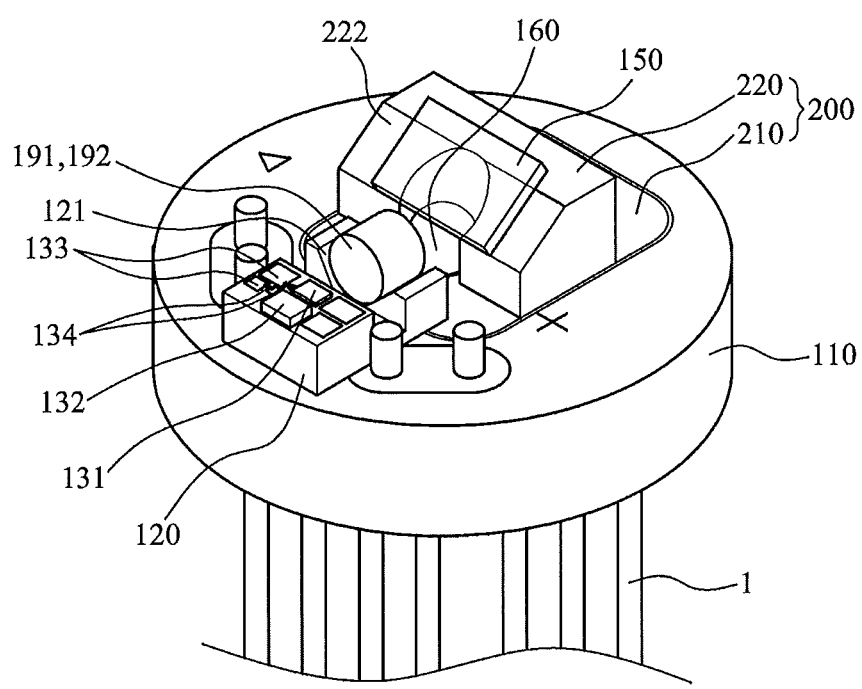
FIG. 9 is a perspective view illustrating a V-groove formed in a platform in FIG. 3.

FIG. 9 is a perspective view illustrating a V-groove formed in a platform in FIG. 3. As illustrated in FIG. 9, the V-groove 121 is formed at the other side of the platform 120. The isolator 191 or the focusing lens 192 disposed between the transmitter 130 and the WDM filter 150 is mounted in the V-groove 121. As described above, by forming the V-groove 121, the focusing lens 192 or the isolator 191 that includes the focusing lens 192 may be manually mounted in the V-groove 121 in a simple manner.

Figure 10:
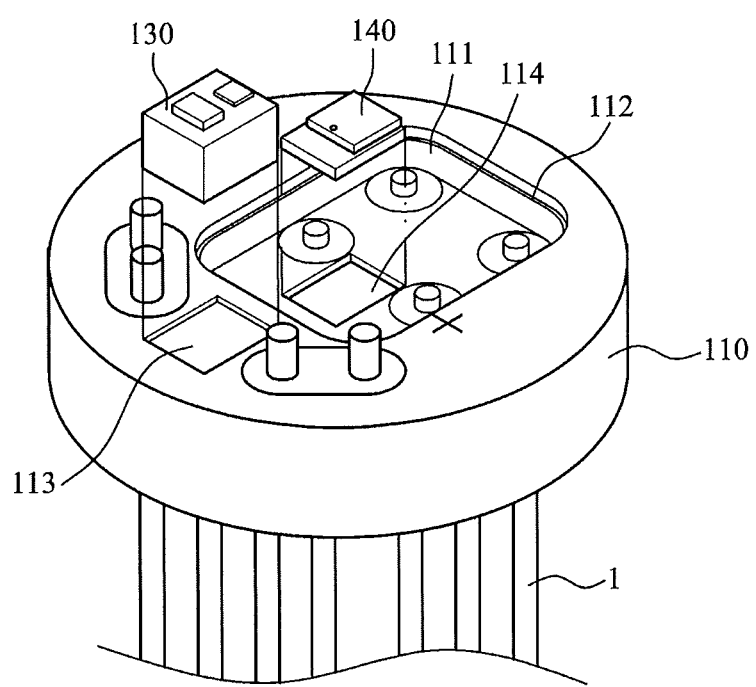
FIG. 10 is perspective view illustrating a platform mounting groove and a receiver mounting groove formed in a package in FIG. 4.

FIG. 10 is perspective view illustrating a platform mounting groove and a receiver mounting groove formed in a package in FIG. 4.

As illustrated in FIG. 10, the package 110 includes a platform mounting groove 113 that is inwardly recessed at a position where the platform 120 is mounted and has a size corresponding to the size of the platform 120. As described above, by forming the platform mounting groove 113 in the package 110, less time may be required to determine a position where the platform 120 is to be mounted, and the platform 120 may be accurately and easily aligned.

Further, a receiver mounting groove 114, which is formed on the bottom surface of the cavity 111, is inwardly recessed at a position where the receiver 140 is mounted and has a size corresponding to the size of the receiver 140. As described above, by forming the receiver mounting groove 114 on the bottom surface of the cavity 111, the receiver 140 may be accurately and easily aligned.

Figure 11:
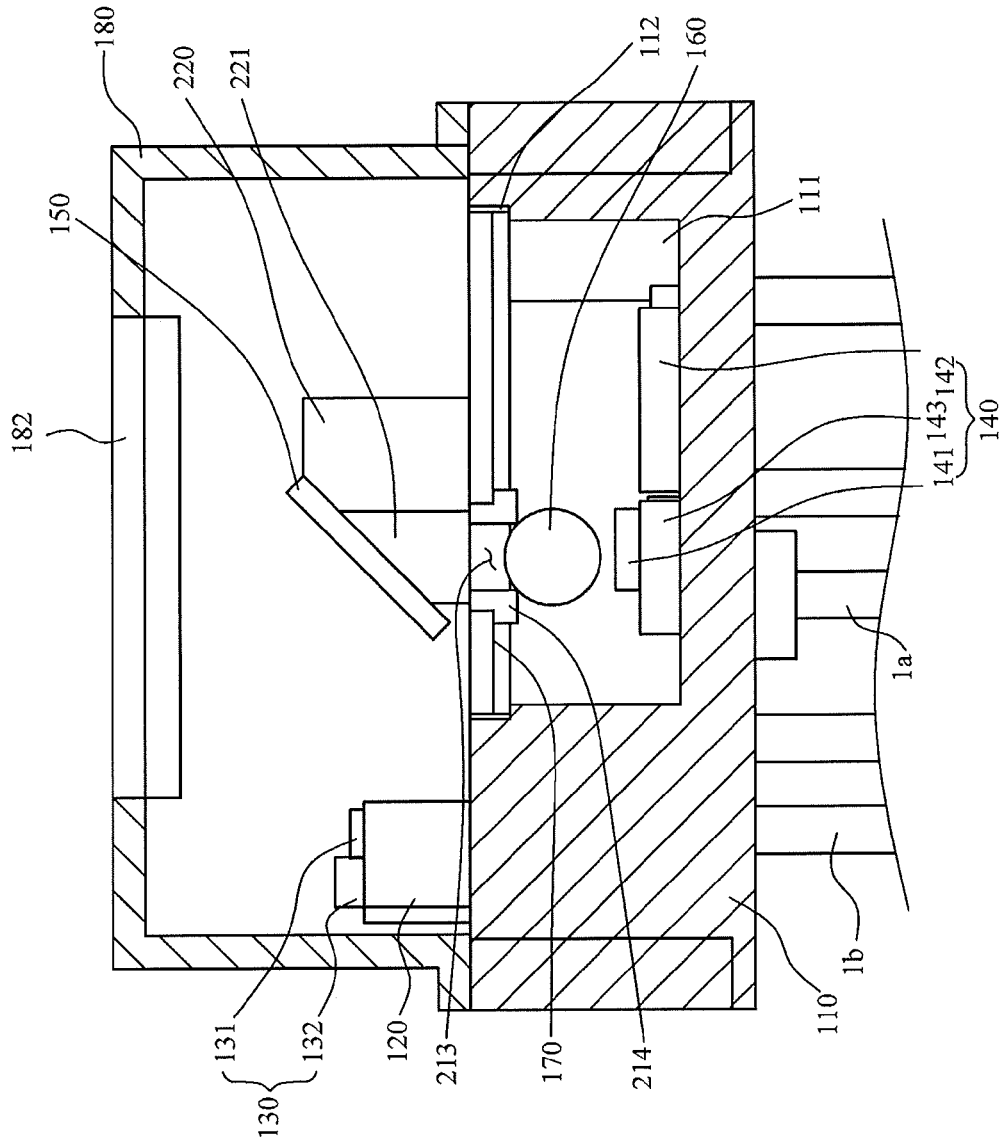
FIG. 11 is a cross-sectional view explaining the structure of a bidirectional optical transceiver module according to another exemplary embodiment.

FIG. 11 is a cross-sectional view explaining the structure of a bidirectional optical transceiver module according to another exemplary embodiment.

As illustrated in FIG. 11, the convex lens 160 having a spherical shape is formed on the bottom of the horizontal portion 210, and an upper portion of the convex lens 160 is accommodated in a mounting groove 213 that is upwardly recessed from the bottom of the horizontal portion 210, so as to be connected to the through-hole 211.

As described above, by forming the mounting groove 213 that is connected to the through-hole 211 on the bottom of the horizontal portion 210, optical alignment may be performed automatically by only mounting the convex lens 160 on the bottom of the horizontal portion 210 and inserting the convex lens 160 into the mounting groove 213. The convex lens 160 may be any other various spherical or aspherical lenses as long as the lens may focus light.

In a modified example, a lens holder 214 having a hollow shape and formed on the top of the convex lens 160 holds the convex lens 160 to be connected thereto. The lens holder 214 may be fitted into the through-hole 211 to be fixed thereto. In this case, the hollow of the lens holder 214 serves as the mounting groove 213 described above.

Figure 13:
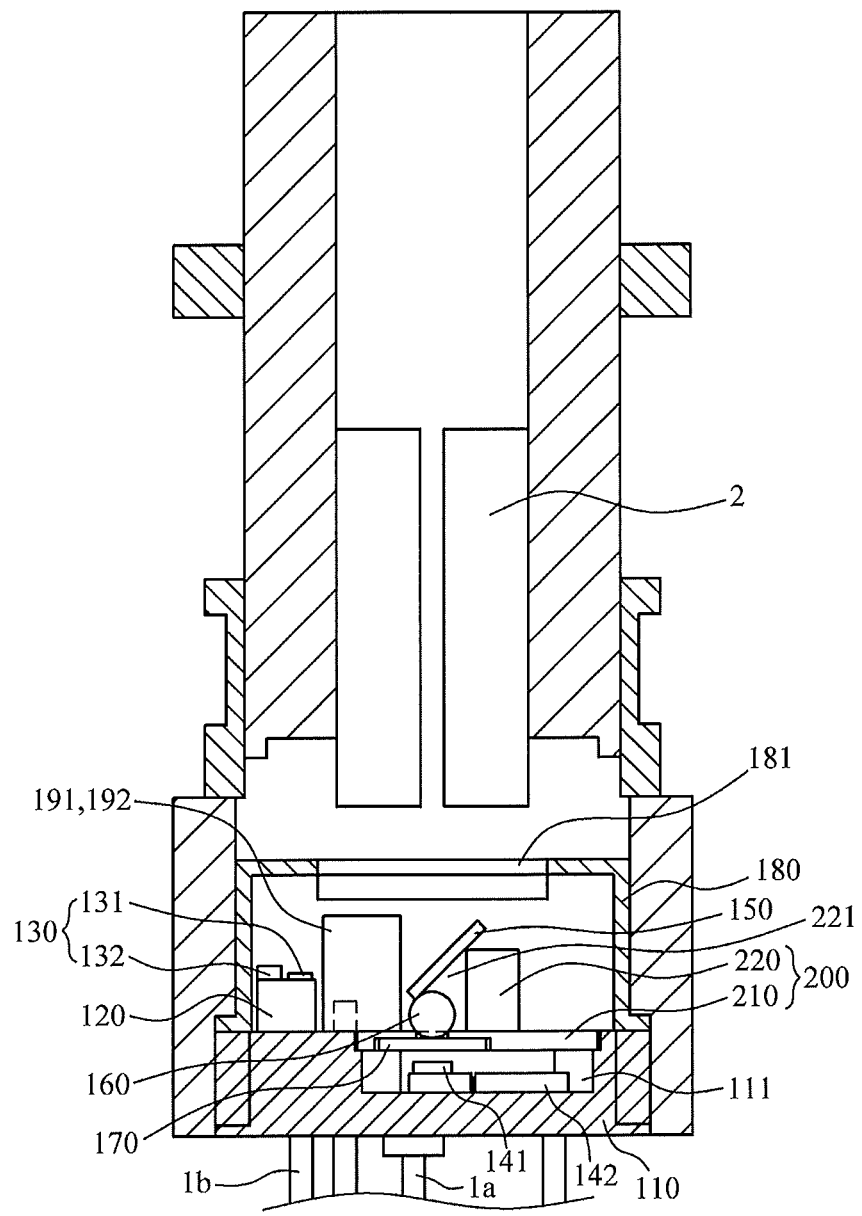
FIG. 13 is a cross-sectional view illustrating an example in which a ring housing is housed and a receptacle is welded in FIG. 1.

FIG. 13 is a cross-sectional view illustrating an example in which a ring housing is housed and a receptacle is welded in FIG. 1, in which the optical transceiver module configured as described above may be packaged in the following order.

First, once the receiver 140 is mounted in the cavity 111, the holder 200 is mounted on the package 110 so that the horizontal portion 210 may cover the cavity 111 to isolate the receiver 140 from the outside.

Subsequently, the convex lens 160 is inserted into the connection hole 221, and the WDM filter 150 is mounted on the inclined surface 222 of the vertical portion 220. In this case, the convex lens 160, the connection hole 221, and the through-hole 211 may be automatically aligned.

Then, the platform 120, the transmitter 130, and the isolator 191 are mounted on the package 110. In another example, the focusing lens 192 may be mounted instead of the isolator 191, and in some cases, the isolator 191 having the focusing lens 192 may be mounted on the package 110. Lastly, after the cap 180 is mounted, a ring housing is mounted, and a receptacle is welded to be fixed.

Figure 14:
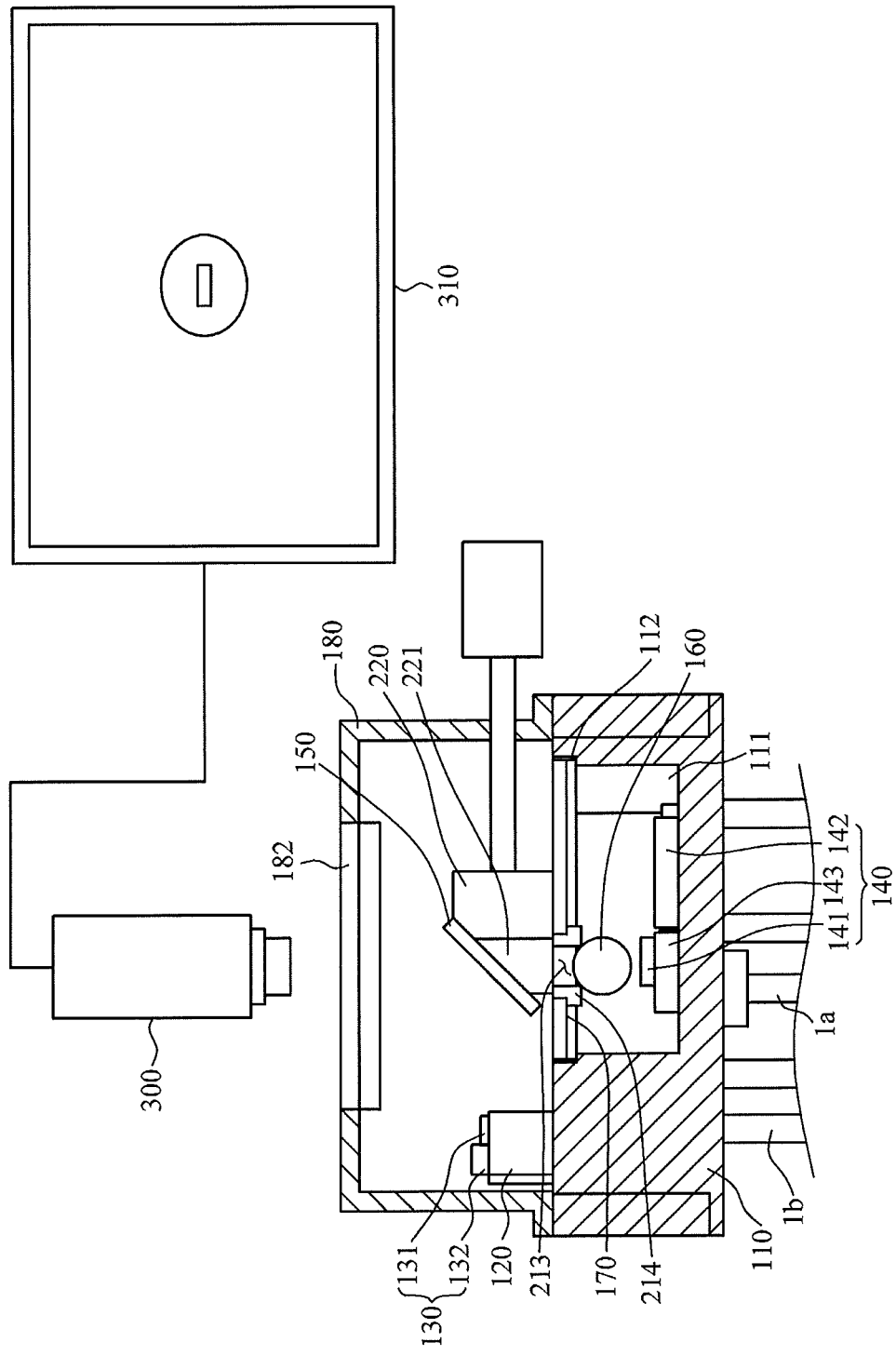
FIG. 14 is a diagram illustrating a method of aligning the bidirectional optical transceiver module according to an exemplary embodiment.

FIG. 14 is a diagram illustrating a method of aligning the bidirectional optical transceiver module according to an exemplary embodiment.

In the present disclosure, the bidirectional optical transceiver module to be aligned includes: the package 110 having on one side the cavity 111 that is inwardly recessed and on the other side the platform mounting groove 113, in which the receiver mounting groove 114 is formed on the bottom surface of the cavity 111, and a plurality of lead wires 1 pass through the package 110; the platform 120 mounted on the package 110 and having an alignment mark to align the transmitter 130; the transmitter 130 mounted on one side of the platform 120 and configured to generate output light according to an electric signal transmitted through at least one of the plurality of lead wires 1; the holder 200 which includes the horizontal portion 210 having the through-hole 211 and disposed on the package 110 to cover the cavity 111, and the vertical portion 220 that protrudes on the top of the horizontal portion 210 and has the connection hole 221 formed to be connected to the through-hole 211 and the inclined surface 222 formed on one side; the receiver 140 mounted in the cavity 111 and configured to pass through the connection hole 221 and the through-hole 211 to generate an electric signal corresponding to input light incident into the cavity 111 and to output the electric signal through at least one of the plurality of lead wires 1; and the WDM filter 150 disposed on the inclined surface 222 of the vertical portion 220 and configured to deliver the output light toward the optical fiber 2 and deliver the input light toward the connection hole 221 and the through-hole 211.

In the present disclosure, the method of aligning the bidirectional optical transceiver module includes: mounting the receiver 140 in the receiver mounting groove 114 of the package 110; mounting the transmitter 130 in the platform 120 by a flip chip bonding method according to the alignment mark formed on the platform 120; mounting the platform 120 in the platform mounting groove 113 of the package 110; and fixing the WDM filter 150 by aligning the holder 200 using a monitor 310 of an optical microscope 300 that is positioned on the same line as an optical axis of the receiver 140 so that active areas of the transmitter 130 and the receiver 140 may overlap with each other. The optical microscope 300 is disposed on an upper portion of the receiver 140 to be aligned with the optical axis. Accordingly, the transmitter 130 and the receiver 140 may be easily mounted at a predetermined position, and the WDM filter 150 may be fixed to the holder 200 by aligning the active areas of the transmitter 130 and the receiver 140 to overlap with each other on the monitor 310 of the optical microscope 300 without power supply.

In the bidirectional optical transceiver module and a method of aligning the same, a number of optical packaging processes may be significantly reduced when compared to a general bidirectional optical transceiver module that uses two or more packages, thereby reducing costs, and significantly reducing optical and electrical crosstalk which is one of the biggest problems in the general optical transceiver module using one package. Further, the alignment tolerance of a receiver may be improved, such that product failure rates may be reduced significantly, and by automatic alignment of the light receiving element, the focusing lens of the receiver, and the WDM filter, optical alignment of the transmitter and the receiver may be easily performed at the same time.

Moreover, even while mounting an isolator, a small bidirectional optical transceiver sub-module may be manufactured to have the same diameter as a general Transmitting Optical Subassembly (TOSA). In addition, by using a platform for a transmitter, the length of a bonding wire may be minimized, and a thin-film resistor with improved high frequency characteristics may be used to enable high-speed signal transmission. Further, as a receiver includes a lead wire formed in a cavity, the length of a lead wire and the length of a bonding wire may be minimized, thereby enabling high-speed signal transmission.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A bidirectional optical transceiver module, comprising:
   a package which has on one side a cavity that is inwardly recessed and through which a plurality of lead wires pass;
   a platform which is mounted on the package;
   a transmitter which is mounted on one side of the platform and generates output light according to an electric signal transmitted through at least one of the plurality of lead wires;
   a holder which includes the horizontal portion having a through-hole and disposed on the package to cover the cavity, and the vertical portion which has the inclined surface on one side and a connection hole connected to the through-hole, and which protrudes on the top of the horizontal portion;
   a receiver which is mounted in the cavity, generates an electric signal that corresponds to input light that passes through the through-hole and the connection hole to be incident into the cavity, and outputs the generated electric signal through at least one of the plurality of lead wires; and
   a wavelength division multiplexing (WDM) filter that is disposed on the inclined surface of the vertical portion to deliver the output light toward an optical fiber and to deliver the input light toward the connection hole and the through-hole.

2. The bidirectional optical transceiver module of claim 1, wherein:
the through-hole has a smaller diameter than the connection hole; and
a convex lens having a spherical or aspherical shape is inserted into the connection hole, with one side of the convex lens being fitted into the through-hole.

3. The bidirectional optical transceiver module of claim 1, wherein:
a step-shaped protrusion is formed on an upper side of the cavity by outwardly extending an inner diameter of the cavity; and
the horizontal portion is mounted on the step-shaped protrusion.

4. The bidirectional optical transceiver module of claim 1, wherein:
a block filter, through which the input light passes after passing through the through-hole, is formed on an inner surface of the horizontal portion.

5. The bidirectional optical transceiver module of claim 4, wherein a receiving groove, in which the block filter is received, is inwardly recessed on the inner surface of the horizontal portion.

6. The bidirectional optical transceiver module of claim 1, wherein the horizontal portion and the vertical portion of the holder are detachable from each other.

7. The bidirectional optical transceiver module of claim 6, wherein a housing groove is inwardly recessed on a bottom surface of the vertical portion, and the block filter is accommodated in the housing groove.

8. The bidirectional optical transceiver module of claim 1, wherein a cap is formed on the top of the package to cover the platform, the transmitter, the holder, and the WDM filter, and includes an opening through which an optical signal is input or output.

9. The bidirectional optical transceiver module of claim 8, wherein a collimating lens is mounted on the opening of the cap.

10. The bidirectional optical transceiver module of claim 1, wherein an isolator is disposed between the transmitter and the WDM filter to deliver only the output light toward the WDM filter.

11. The bidirectional optical transceiver module of claim 1, wherein a focusing lens is disposed between the transmitter and the WDM filter to focus the output light.

12. The bidirectional optical transceiver module of claim 1, wherein a V-groove is formed at the other side of the platform, and the isolator or the focusing lens disposed between the transmitter and the WDM filter is mounted in the V-groove.

13. The bidirectional optical transceiver module of claim 1, wherein the package has a platform mounting groove that is inwardly recessed at a position where the platform is mounted.

14. The bidirectional optical transceiver module of claim 1, wherein a receiver mounting groove formed on the bottom surface of the cavity is inwardly recessed at a position where the receiver is mounted.

15. The bidirectional optical transceiver module of claim 1, wherein:
a convex lens having a spherical or aspherical shape is formed on the bottom of the horizontal portion; and
an upper portion of the convex lens is accommodated in a mounting groove that is upwardly recessed from the bottom of the horizontal portion, so as to be connected to the through-hole.

16. A method of aligning a bidirectional optical transceiver module, the method is performed by the bidirectional optical transceiver module comprising: a package having on one side a cavity that is inwardly recessed and on the other side a platform mounting groove, wherein a receiver mounting groove is formed on the bottom surface of the cavity, and a plurality of lead wires pass through the package; a platform mounted on the package and having an alignment mark to align a transmitter; the transmitter mounted on one side of the platform and configured to generate output light according to an electric signal transmitted through at least one of the plurality of lead wires; a holder which includes the horizontal portion having a through-hole and disposed on the package to cover the cavity, and the vertical portion which has the inclined surface on one side and a connection hole connected to the through-hole, and which protrudes on the top of the horizontal portion; a receiver which is mounted in the cavity, generates an electric signal that corresponds to input light that passes through the through-hole and the connection hole to be incident into the cavity, and outputs the generated electric signal through at least one of the plurality of lead wires; and a WDM filter disposed on the inclined surface of the vertical portion and configured to deliver the output light toward the optical fiber and deliver the input light toward the connection hole and the through-hole,
wherein the method comprising:
mounting the receiver in the receiver mounting groove of the package;
mounting the transmitter in the platform according to the alignment mark formed on the platform;
mounting the platform in the platform mounting groove of the package; and
fixing the WDM filter by aligning the holder using a monitor of an optical microscope that is positioned on the same line as an optical axis of the receiver so as to overlap active areas of the transmitter and the receiver.

* * * * *